United States Patent
Colebrook et al.

[15] 3,650,348
[45] Mar. 21, 1972

[54] SUPERSONIC NOISE SUPPRESSOR

[72] Inventors: Ross W. Colebrook, Seattle, Wash.; Peter H. Ellis, Chula Vista, Calif.

[73] Assignees: The Boeing Company, Seattle, Wash.; Rohr Corporation, Chula Vista, Calif.

[22] Filed: Feb. 19, 1970

[21] Appl. No.: 12,660

[52] U.S. Cl..................181/33 HC, 181/33 HD, 239/127.3, 239/265.17, 239/265.25
[51] Int. Cl......................B64d 33/06, F01n 1/14, F01n 1/16
[58] Field of Search........................181/33, 43, 51, 60, 33.22, 181/33.221, 33.222; 239/127.3, 265.11, 265.13, 265.17, 265.19, 265.25–265.43

[56] References Cited

UNITED STATES PATENTS

| | | | |
|---|---|---|---|
| 3,392,529 | 7/1968 | Pike et al. | 181/33.222 |
| 2,546,293 | 3/1951 | Berliner | 239/265.43 |
| 2,987,883 | 6/1961 | Lawler | 181/33.222 |
| 3,007,304 | 11/1961 | Wotton et al. | 239/265.43 |

FOREIGN PATENTS OR APPLICATIONS

| | | | |
|---|---|---|---|
| 874,496 | 8/1961 | Great Britain | 181/33.222 |
| 918,018 | 2/1963 | Great Britain | 239/265.39 |
| 618,154 | 4/1961 | Canada | 181/33.221 |
| 1,254,777 | 1/1961 | France | 181/33.221 |
| 894,298 | 4/1962 | Great Britain | 181/33.221 |

Primary Examiner—Robert S. Ward, Jr.
Attorney—Glenn Orlob, Kenneth W. Thomas and Kenneth M. MacIntosh

[57] ABSTRACT

A jet exhaust nozzle having articulated variable geometry segments attached to the downstream end of an exhaust duct and an actuator to articulate the segments between a corrugated subsonic noise suppression configuration and a divergent expansion surface supersonic cruise configuration. When applied to a multi-tube exhaust nozzle, closeable apertures are provided in a surrounding nacelle shroud to ventilate the spaces between the tubes.

7 Claims, 9 Drawing Figures

INVENTORS
ROSS W. COLEBROOK
PETER H. ELLIS
BY
Kenneth M. MacIntosh
ATTORNEY

Patented March 21, 1972

INVENTORS:
ROSS W. COLEBROOK
PETER H. ELLIS
BY

ATTORNEY

Patented March 21, 1972

INVENTORS
ROSS W. COLEBROOK
PETER H. ELLIS
BY
Kenneth M. MacIntosh
ATTORNEY

Patented March 21, 1972 3,650,348

INVENTORS:
ROSS W. COLEBROOK
PETER H. ELLIS
BY
Kenneth M. MacIntosh
ATTORNEY

SUPERSONIC NOISE SUPPRESSOR

BACKGROUND OF THE INVENTION

This invention relates to jet aircraft exhaust nozzles and more particularly to variable geometry exhaust nozzles for supersonic aircraft that provide jet noise suppression at subsonic speeds and efficient thrust generation at supersonic speeds.

Because the exhaust noise from jet engines used on large commercial airplanes can be a major source of community annoyance in the vicinity of airports, the aircraft industry has been expending considerable effort to reduce the jet noise problem and thus increase the public acceptance of larger and faster commercial airplanes. For subsonic airplanes a reasonable degree of sound suppression has been obtained by forming corrugations in the peripheral walls of the jet engine nozzle or by the use of a plurality of smaller tubes branching out from a single large exhaust duct. The prior art has also seen the combination of both noise suppression techniques by the incorporation of a plurality of small tubes the downstream ends of which are formed into corrugations.

All jet noise suppression techniques of this type impose some thrust penalty on the airplane but this penalty has been generally acceptable for subsonic airplanes. However, in the case of airplanes designed for supersonic flight, the configurations required for efficient thrust generation are incompatible with the multi-tube or corrugated tube configurations that have been developed for subsonic airplanes. In particular, subsonic flight requires an exhaust nozzle having a convergent downstream end while supersonic flight requires a divergent end nozzle. When it is realized that for long range supersonic aircraft the percentage of time spent in the vicinity of a terminal or community where sound suppression is important represents but a small part of the total flight time, it will be appreciated that any penalty imposed by a configuration optimized for sound suppression will have a drastic detrimental effect on the overall performance of the airplane.

SUMMARY

It is an object of this invention to provide a jet engine exhaust nozzle that suppresses jet noise at subsonic conditions and provides efficient thrust generation at supersonic conditions.

It is another object of this invention to provide a variable geometry exhaust nozzle for jet aircraft power plants that provide both noise suppression and efficient thrust generation.

It is yet another object of this invention to provide a multi-tube noise suppressor for jet aircraft power plants having variable geometry articulation that provides jet noise suppression at subsonic conditions and efficient thrust generation at supersonic conditions.

It is a further object of this invention to provide a multi-tube articulated variable geometry exhaust nozzle for jet aircraft having means to ventilate the space between the tubes for decreased base area drag.

These and other objects of the invention are provided by the embodiments of a supersonic noise suppressor described herein wherein the downstream end of a jet engine exhaust duct is provided with a plurality of articulated segments that, when actuated to a noise suppression position, form a plurality of radially extending corrugations and which, when actuated to a supersonic cruise position, form a substantially continuous curvilinear divergent expansion surface for efficient thrust generation at supersonic velocities. When the principals of this invention are applied to a multi-tube exhaust nozzle enclosed within a nacelle, closable apertures are provided in the peripheral wall of the nacelle upstream of the tubes to permit the entrance of ambient air into the nacelle to ventilate the spaces between the tubes and to reduce the base area drag of the nozzle. Actuating means are provided to continually adjust the articulated segments between the noise suppression position and the supersonic cruise position in order to provide an optimum nozzle configuration for all flight regimes. These and other features and advantages of the invention will become more readily apparent to those skilled in the art from the following detailed description of specific embodiments thereof, taken in connection with the accompanying drawings.

DESCRIPTION OF THE PREFERRED EMBODIMENTS

Figure 1:
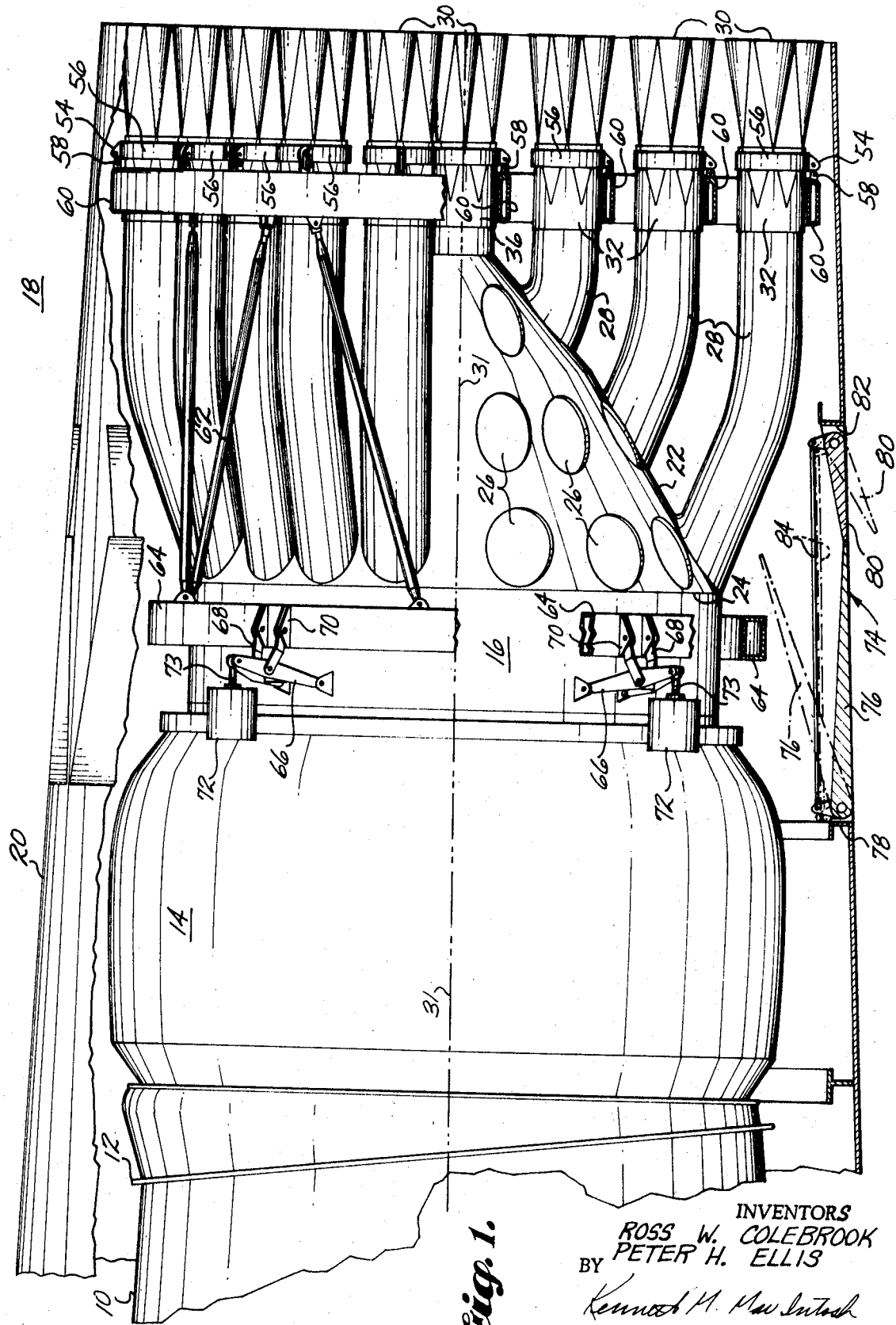
FIG. 1 is a side view of the aft section of a power plant for a supersonic airplane using the exhaust nozzle of this invention partially in section and with parts broken away to illustrate some interior construction.

Referring now to FIG. 1, wherein there is shown a supersonic jet engine power plant incorporating certain features of this invention, jet engine 10 terminates in an engine aft flange 12 to which there is fastened a thrust reverser apparatus 14 which may be of any conventional design. At the downstream end of thrust reverser 14 there is fastened an exhaust duct 16 which conveys the exhaust gases issuing from jet engine 10 to the noise suppressor shown generally at 18. Jet engine 10, thrust reverser 14 and noise suppressor 18 are enclosed within nacelle structure 20 which has been broken away at various places in FIG. 1 to more clearly show the structure contained within. Noise suppressor 18 includes a conical or other conveniently shaped bulkhead 22 fastened to the aft or downstream end 24 of exhaust duct 16. Bulkhead 22 has a plurality of apertures 26 formed therein and also has attached thereto a corresponding plurality of exhaust tubes 28 which convey the exhaust gases to exhaust nozzles 30. Exhaust tubes 28 branch radially outward from bulkhead 22 and then extend downstream generally parallel to longitudinal axes 31 of noise suppressor 18. While exhaust tubes 28 may be either circular or elliptical in cross section, it often is preferable in the practice of this invention that they have terminating ends of a square, hexagon, or other polygon cross section. Thus, between the circular or elliptical cross section of tubes 28 and nozzles 30 there have been provided transition sections 32 mating the generally circular or elliptical exhaust tubes 28 with the square or hexagonal exhaust nozzles 30.

Figure 3A:
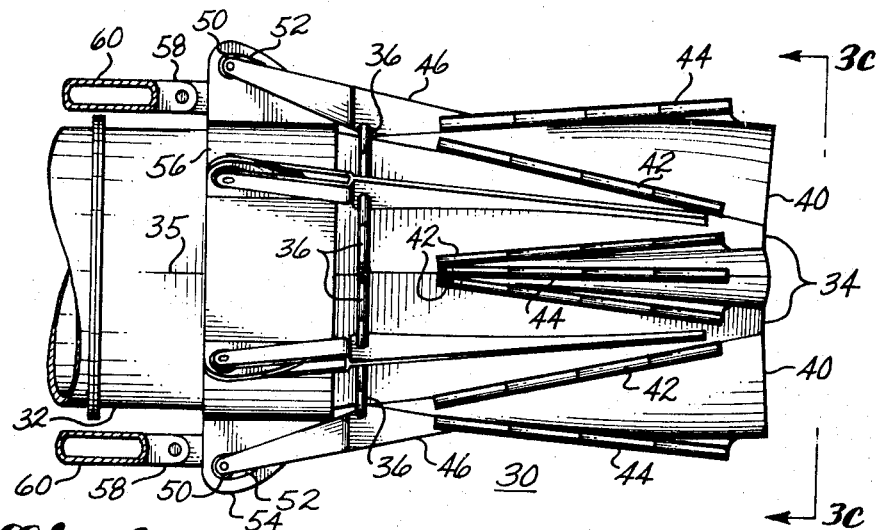
FIG. 3a is an exterior side view, partially in section, of a single tube of the FIG. 1 nozzle showing the articulating segments in the noise suppression position.
Figure 3B:
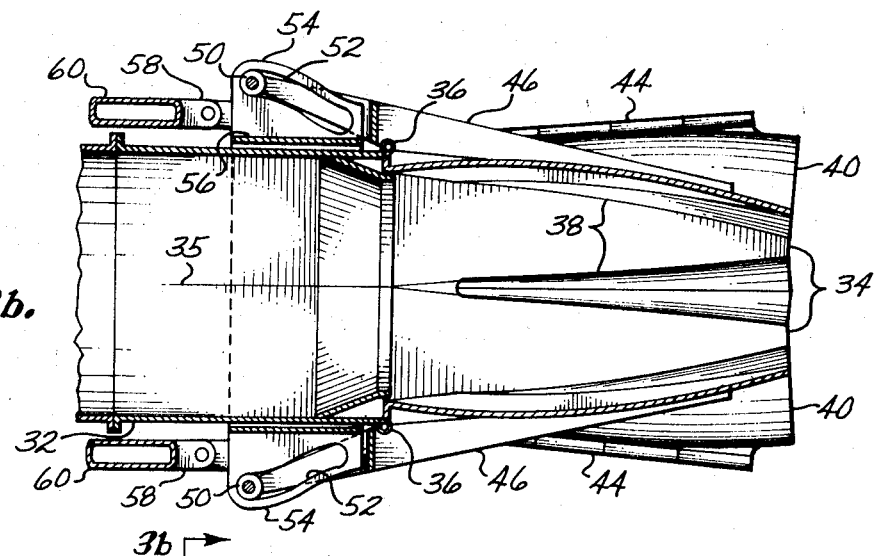
FIG. 3b is an interior side view, partially in section, of a single tube of the FIG. 1 nozzle showing the articulating segments in the noise suppression position.
Figure 3C:
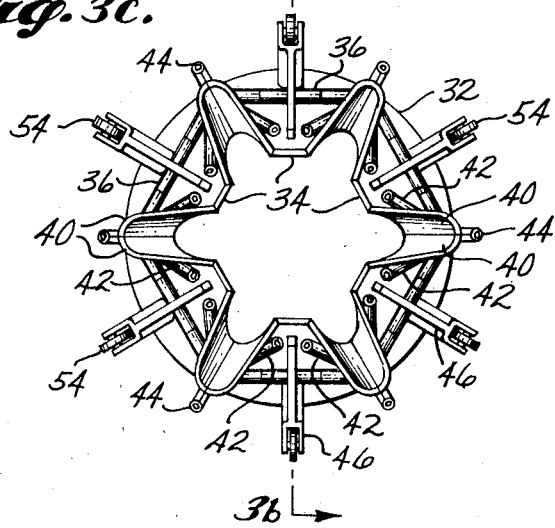
FIG. 3c is a downstream end view of the exhaust tube shown in FIGS. 3a and 3b.

Exhaust nozzles 30 comprise a plurality of articulating segments which can be positioned to impart a variable geometry cross section to the exhaust gas stream issuing therefrom. FIGS. 3a through c show details of these articulating segments as applied to a fixed geometry transition section 32 of exhaust tube 28 that is hexagonal in cross section at its downstream end. Referring now to FIGS. 3a through 3c, articulating exhaust nozzle 30 is seen to comprise six first segments 34 each of which is pivotally attached by hinges 36 to the downstream end of hexagonal transition section 32. First segments 34 extend downstream from the downstream end of transition section 32 and, in the position shown in FIGS. 3a through 3c, first segments 34 are seen to converge curvilinearally inward toward longitudinal axes 35 of exhaust nozzle 30. The width of first segments 34 tapers substantially from their upstream ends to their downstream ends, and arcuate longitudinal edges 38 extend a substantial portion of the length of first segments 34.

Between every two adjacent first segments 34 there is a pair of second segments 40 which together extend radially outward from longitudinal axes 35 of exhaust nozzle 30. The inner longitudinal edges of second segments 40 are of an arcuate configuration to match the arcuate longitudinal edges 38 of first segments 34 and are pivotally joined thereto by hinges 42. At their outward longitudinal edges, second segments 40 are pivotally attached to each other by hinges 44. Thus, when exhaust nozzle 30 is in the sound suppression position as shown in FIGS. 3a through 3c, the pairs of second segments 40 extend downstream from transition section 32 of exhaust tube 28 and diverge radially outward from longitudinal axes 35 of exhaust nozzle 30 and said pairs of second segments 40 cooperate with the inwardly converging first segments 34 to form radially outwardly extending corrugations through which the exhaust gases flow.

Figure 4A:
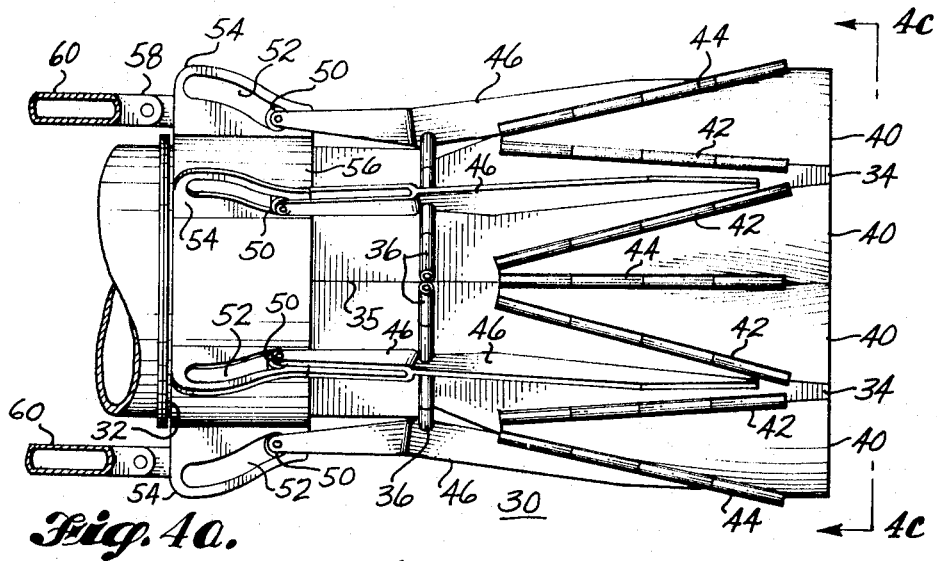
FIG. 4a is an exterior side view, partially in section, of a single tube of the nozzle shown in FIG. 1 with the articulating segments in the supersonic cruise position.
Figure 4B:
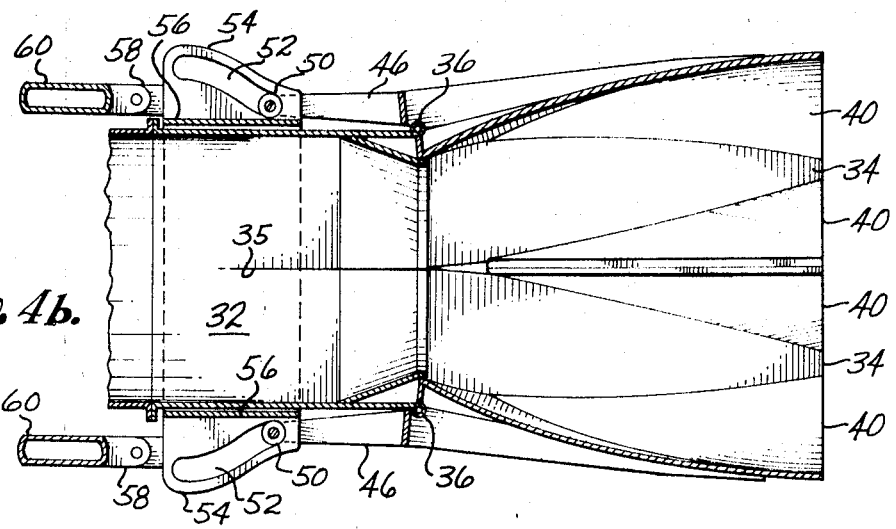
FIG. 4b is an interior side view, partially in section, of a single tube of the nozzle shown in FIG. 1 with the articulating segments in the supersonic cruise position.
Figure 4C:
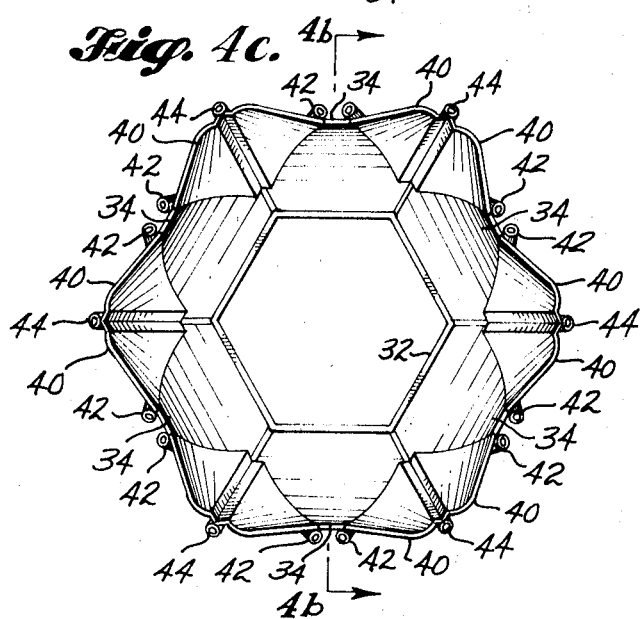
FIG. 4c is a downstream end view of the exhaust tube shown in FIGS. 4a and 4b.

FIGS. 4a through 4c show exhaust nozzle 30 positioned in the supersonic cruise condition. In those figures, it can be seen that first segments 34 have been pivoted about hinges 36 so as to curvilinearly diverge outward from nozzle axis 35 as they extend downstream from transition section 32 of exhaust tube 28. Pairs of second segments 40 have rotated about their common hinges 44 and hinges 42, by which they are attached to first segments 34, to form in cooperation with first segments 34 a substantially continuous curvilinear divergent exhaust gas expansion surface.

Figure 2A:
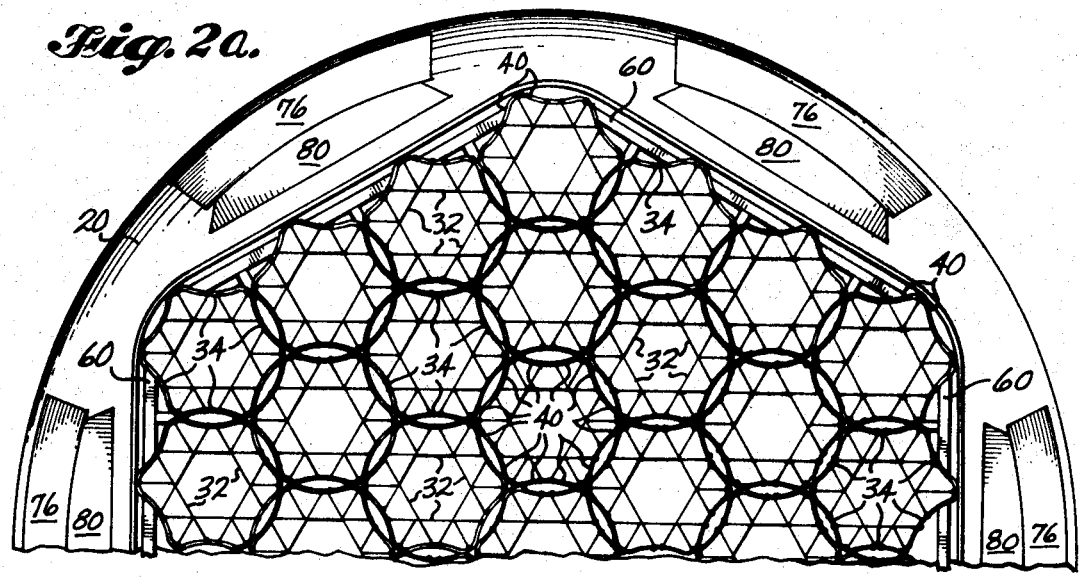
FIG. 2a is a partial downstream end view of the nozzle of FIG. 1 showing the articulated segments in the supersonic cruise position.
Figure 2B:
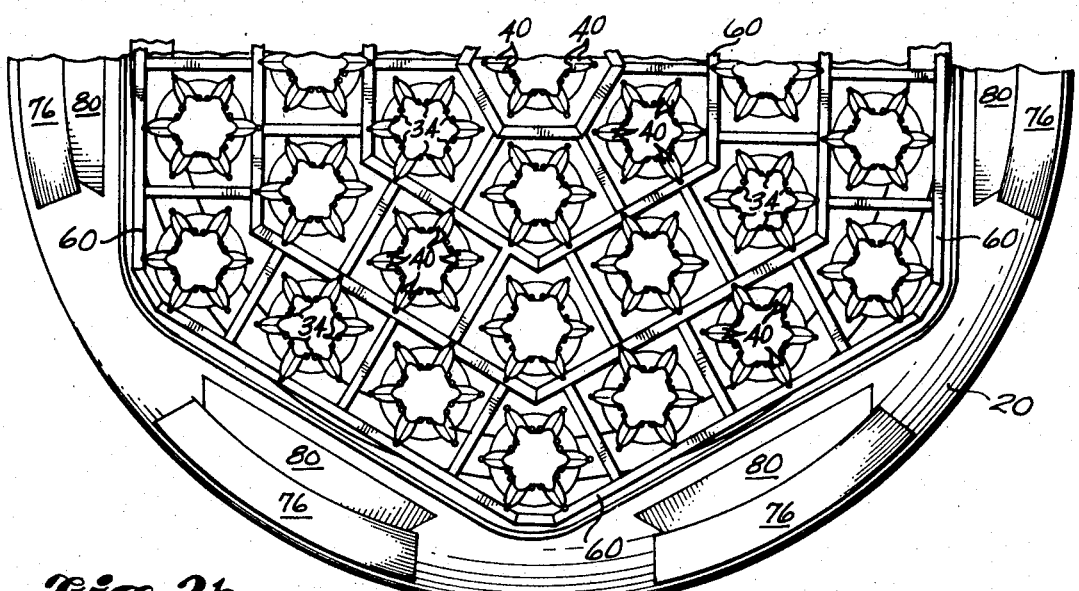
FIG. 2b is a partial downstream end view of the nozzle of FIG. 1 showing the articulated segments in the noise suppression position.

Actuation of the articulating exhaust nozzle 30 between the noise suppression position shown in FIGS. 3a through 3c and the supersonic cruise position shown in FIGS. 4a through 4c is provided by lever 46 having an aft end attached to each of first segments 34, and having a cam follower 50 attached to its forward end. Cam follower 50 engages cam slot 52 formed in ear 54 which is carried by collar 56 slideably mounted for fore-and-aft longitudinal movement on exhaust tubes 28 near their downstream ends. When the downstream edge of transition section 32 is hexagonal in cross section, there will be six ears 54 mounted on collar 56 and interconnected by six levers 46 to the six first segments 34 of each exhaust nozzle 30. The forward edges of at least two of the six ears 54 are attached by linkage means 58 to actuating ring 60. As is more clearly seen in FIGS. 2a and 2b, actuating ring 60 is in the form of a lattice structure, individual elements of which surround each of the exhaust tubes 28.

Referring now to FIG. 1, actuating ring 60 is supported by a plurality of struts 62 which are attached forward of actuating ring 60 to synchronizing ring 64 which is circumferentially positioned around, but spaced away from, exhaust duct 16. Synchronizing ring 64 is attached to exhaust duct 16 by several circumferentially spaced A-frame brackets 66, arms 68 and ears 70. At their inner ends, each A-frame bracket 66 is pivotally attached to exhaust duct 16 to permit pivotal fore-and-aft movement of A-frame bracket 66 in response to actuator 72. The fore-and-aft movement of A-frame bracket 66 is conveyed through synchronizing ring 64, struts 62, actuating ring 60, and linkage means 58 to ears 54 containing the cam slots 52. Thus, when connecting rod 73 of actuator 72, which may conveniently be a hydraulic piston actuator attached to exhaust duct 16, is extended, ear 54 will be in the aft position as shown in FIGS. 3a through 3c causing the forward end of levers 46, through the action of cam follower 50 in cam slot 52 to extend radially outward and the aft end of levers 46 to extend radially inward toward the axis 35 of exhaust nozzle 30. First segments 34, which are attached to the aft end of levers 46, will then assume their radially converging positions thus forming, in cooperation with second segments 40, the corrugated nozzle configuration for jet noise suppression. As connecting rod 73 of actuator 72 is withdrawn to its forward position, ears 54 will also move forwardly and through the caming action of cam slot 52 on cam follower 50, the forward ends of levers 46 will be moved radially inward toward the longitudinal axis 35 of exhaust nozzle 30 causing the aft ends of levers 46 and first segments 34 carried by said aft ends to move radially outward to form in cooperation with second segments 40 the substantially continuous curvilinear divergent exhaust gas expansion surface of nozzle 30 required for supersonic cruise.

The operation of actuator 72 may be controlled directly by the pilot or a control system could be used to direct the actuator to move to the correct position: full aft or downstream for noise suppression, intermediate position for trans-sonic operation, and full forward or upstream for supersonic cruise. A control system of this type would require inputs from the engine and the airplane central air data system much in the same manner as such inputs are used for the air inlet controls on supersonic airplanes.

In order to reduce drag factors and to increase noise suppression when the nozzle of this invention is operated in the noise suppression mode, it is desirable to introduce ambient air into nacelle 20 and around exhaust tubes 28 to mix with the exhaust gases downstream of nozzles 30. For this purpose, circumferentially spaced ventilating apertures are provided in the nacelle structure 20 somewhat upstream of nozzles 30. As is seen in FIG. 1, nacelle ventilating apertures 74 are provided with door structures comprising blow-in door 76, which opens inwardly and is pivotally attached to the forward edge 78 of aperture 74 and scoop door 80, which opens outwardly and is pivotally attached to the aft edge 82 of aperture 74. Thus the ejector action of exhaust gases leaving the corrugated ends of exhaust nozzles 30, when positioned in the noise suppression position, entrains atmospheric air and provides a pressure differential sufficient to cause the inward opening of blow-in door 76. Through linkage means 84, connecting blow-in door 76 and scoop door 80, the inward opening movement of blow-in door 76 causes an outward opening movement of scoop door 80. Conversely, when blow-in door 76 returns to the closed position, scoop door 80 through linkage means 84 is also moved to the closed position.

While in the practice of this invention transition sections 32 of exhaust tubes 28 having a downstream end cross section other than a hexagon may be used, the hexagonal shape has been illustrated in this embodiment to point out several advantages attendant to it. One of the most important of these can be understood with reference to FIG. 2a in which the ends of exhaust nozzles 30 are shown in their divergent or supersonic cruise position. As can be seen there, with exhaust nozzles 30 attached to a hexagonal fixed geometry exhaust tube transition section 32, the downstream edges of segments 34 and 40 are adjacent and nest close to the downstream edges of corresponding segments of adjacent tubes. Thus the exhaust streams from all of the exhaust nozzles 30 become contiguous and leave the airplane as one large jet. The spaces between the downstream ends of exhaust nozzles 30 are substantially eliminated thus reducing the base area, and its consequent drag factor, of the composite nozzle structure to an absolute minimum. The reduction of base area in this manner can be accomplished by using nozzle configurations other than a hexagon such as by the use of transition sections 32 having a downstream cross section in the shape of a square. While the square shaped configuration has the advantage of fewer moving parts, the increased number of corrugations provided by the hexagonal configuration greatly increases the effectiveness of the noise suppression characteristics and warrants the increased complexity of design.

While the articulating jet exhaust nozzle of this invention has been described as applied to a multi-tube jet exhaust nozzle, it should be borne in mind that the articulating features of this invention may be incorporated into a single tube exhaust duct or nozzle. In either event, what is provided by this invention is an articulating jet exhaust nozzle having a plurality of moveable segments attached to the downstream end of a fixed geometry exhaust duct, said segments being capable of moving between a first position where they form radially extending corrugations at the downstream end of the nozzle to provide efficient jet noise suppression, and a second position whereby the articulating segments cooperate to form a curvilinear divergent exhaust gas expansion surface for efficient thrust generation at supersonic cruise conditions. Actuating means are provided to position the moveable segments to either the first or second positions, or at any position in between, to match the pressure ratio and Mach number of the airplane.

It is to be understood that the invention is not limited to the specific embodiments herein illustrated and described. It may be used in other ways without departure from its spirit as defined by the following claims.

We claim:

1. A combined multi-tube subsonic jet noise suppressor and supersonic exhaust gas expansion nozzle for supersonic aircraft jet propulsion plants comprising: a plurality of jet exhaust tubes for passage of jet exhaust gas therethrough, each of said tubes having a longitudinal axis and terminating in a downstream end; first longitudinally extending segments pivotally attached to the downstream ends of at least certain of said exhaust tubes and having arcuate longitudinal edges; said first segments converging inwardly toward the longitudinal axis of said exhaust tubes when positioned in a subsonic noise suppression position, and said first segment diverging outwardly away from the longitudinal axis of said exhaust tubes when positioned in a supersonic cruise position; longitudinally extending second segment means having arcuate longitudinal edges pivotally attached to the longitudinal edges of said first segments; said second segment means cooperating with said first segments to form radially outwardly extending corrugations downstream of said exhaust tube ends when said first segments are positioned in the subsonic noise suppression position, and said second segment means cooperating with said first segments to form a substantially continuous curvilinear divergent exhaust gas expansion surface downstream of said exhaust tube ends when said first segments are positioned in the supersonic cruise position; and actuating means operatively associated with said first segments for selectively moving said first segments between the subsonic noise suppression position and the supersonic cruise position wherein said plurality of jet exhaust tubes are circumferentially enclosed within a tubular nacelle and further including ventilating means in the nacelle wall upstream of said tube ends for selectively admitting ambient air flow into the nacelle and between said tubes to mix with the exhaust gases downstream of said tube ends.

2. The apparatus as claimed in claim 1 wherein said ventilating means comprises: means defining a plurality of circumferentially arranged apertures, each of said means having an upstream edge wall and a downstream edge wall; blow-in door means, partially closing the apertures, pivotally attached to said upstream edge wall and operable to open inwardly of said nacelle wall in response to the pressure differential between the ambient air and the exhaust gases; scoop door means, closing the apertures in cooperation with said blow-in door means, pivotally attached to said downstream edge wall and operable to open outwardly of the nacelle wall in response to the opening of said blow-in door; and linkage means interconnecting said blow-in door means and said scoop door means.

3. The apparatus as claimed in claim 1 wherein said actuating means comprises: collar means slideably mounted for longitudinal movement on each of said exhaust tubes adjacent the downstream ends thereof; cam means carried by each of said collar means; longitudinally extending lever means having upstream ends and downstream ends, said downstream ends attached to said first segments; cam follower means carried by the upstream end of said lever means and engaging said cam means; actuating ring lattice means surrounding each of said exhaust tubes and connected to each of said collar means for longitudinal movement therewith; and power operative means operatively connected to said actuating ring lattice means for selective reciprocal longitudinal movement of said lattice means; whereby the selective reciprocal longitudinal movement of said power operating means is transferred by said lattice means to synchronously actuate each of said cam and cam follower means for moving said first segments between the noise suppression position and the supersonic cruise position.

4. The apparatus claimed in claim 1 wherein said plurality of jet exhaust tubes are spaced apart in hexagonal array and each of said exhaust tubes terminate in a hexagonally shaped downstream end; and wherein said first segment and said second segment means associated with each of said exhaust tubes have downstream terminating ends nesting adjacent the corresponding downstream terminating ends associated with surrounding exhaust tubes, when said first segments are positioned in the supersonic cruise position.

5. A multiple tube exhaust nozzle for aircraft jet propulsion plants comprising: a plurality of exhaust tubes for passage of exhaust gases therethrough, each of said tubes terminating in a fixed geometry downstream end; longitudinally extending articulating segments mounted on the downstream ends of said exhaust tubes, said segments cooperatively forming outward radially extending corrugations downstream of said exhaust tube ends when moved to a first position for jet exhaust noise suppression, and said segments cooperatively forming a substantially continuous divergent exhaust gas expansion surface downstream of each exhaust tube end when moved to a second position for aircraft supersonic cruise; and actuating means operatively associated with said segments for selectively moving said segments between the first and the second position; wherein said plurality of jet exhaust tubes are circumferentially enclosed within a tubular nacelle and further including ventilating means in the nacelle wall upstream of said tube ends for selectively admitting ambient air flow into the nacelle and between said tubes to mix with the exhaust gases downstream of said tube ends.

6 The apparatus as claimed in claim 5 wherein said plurality of jet exhaust tubes are spaced apart in hexagonal array and each of said exhaust tubes terminate in a hexagonally shaped downstream end; and wherein said longitudinally extending articulating segments associated with each of said exhaust tubes have downstream terminating ends nesting adjacent the corresponding downstream terminating ends associated with surrounding exhaust tubes, when said articulating segments are positioned in the supersonic cruise position.

7. The apparatus as claimed in claim 5 wherein said longitudinally articulated segments comprise: first longitudinally extending segments pivotally attached to the fixed geometry end of said exhaust duct and having longitudinal edges; said first segments converging radially into the exhaust gas stream when in a noise suppression position, and said first segments diverging radially outward when in a cruise position, and longitudinally extending second segment means having longitudinal edges pivotally attached to the longitudinal edges of said first segments; said second segment means cooperating with said first segments to form radially outwardly extending corrugations downstream of said fixed geometry end when in the noise suppression position, and said second segment means cooperating with said first segments to form a substantially continuous divergent exhaust gas stream expansion surface downstream of said fixed geometry end when in the cruise position.

* * * * *